US012332142B2

(12) United States Patent
Fendler

(10) Patent No.: US 12,332,142 B2
(45) Date of Patent: Jun. 17, 2025

(54) PROTECTIVE BELLOWS HAVING AN ELECTRICAL CIRCUIT AND COVERING FOR A MECHANICAL JOINT

(71) Applicant: COMMISSARIAT À L'ENERGIE ATOMIQUE ET AUX ENERGIES ALTERNATIVES, Paris (FR)

(72) Inventor: Manuel Fendler, Grenoble (FR)

(73) Assignee: COMMISSARIAT À L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 253 days.

(21) Appl. No.: 18/002,759

(22) PCT Filed: Jun. 21, 2021

(86) PCT No.: PCT/EP2021/066884
§ 371 (c)(1),
(2) Date: Dec. 21, 2022

(87) PCT Pub. No.: WO2021/259879
PCT Pub. Date: Dec. 30, 2021

(65) Prior Publication Data
US 2023/0243714 A1 Aug. 3, 2023

(30) Foreign Application Priority Data

Jun. 24, 2020 (FR) ........................... 2006627

(51) Int. Cl.
*G01M 3/40* (2006.01)
*F16J 3/04* (2006.01)
(Continued)

(52) U.S. Cl.
CPC ............. *G01M 3/165* (2013.01); *F16J 3/041* (2013.01); *F16J 15/52* (2013.01)

(58) Field of Classification Search
CPC .............. F16J 3/041; F16J 15/52; G01M 3/40
See application file for complete search history.

(56) References Cited

U.S. PATENT DOCUMENTS

| 4,464,128 | A | 8/1984 | Aso et al. | |
| 2021/0018047 | A1* | 1/2021 | Ono | F16D 3/202 |
| 2021/0123481 | A1* | 4/2021 | Yoshinaga | F16D 3/845 |

FOREIGN PATENT DOCUMENTS

| JP | 2009-67117 A | 4/2009 |
| JP | 2012-224274 A | 11/2012 |
| JP | 2013-117241 A | 6/2013 |

OTHER PUBLICATIONS

International Search Report mailed on Oct. 8, 2021 in PCT/EP2021/066884 filed on Jun. 21, 2020 (2 pages).

* cited by examiner

*Primary Examiner* — Eric S. McCall
(74) *Attorney, Agent, or Firm* — Oblon, McClelland, Maier & Neustadt, L.L.P.

(57) ABSTRACT

A bellows including a cylindrical and corrugated side wall, extending about a longitudinal axis, the side wall including: an alternation of crests and of troughs, forming corrugations; flanks, each flank extending between a crest and a trough, each corrugation having a first flank and a second flank that are opposite, separated by a same trough; the bellows includes at least one elementary electrical circuit associated with a corrugation, the elementary electrical circuit includes a first conductive element and a second conductive element, extending along the first flank and/or the second flank, the first conductive element being separated from the second conductive element; a first conductive track and a second conductive track, linked respectively to the first conductive element and to the second conductive element, and the first conductive track and the second conductive track are con- (Continued)

figured to be connected, to a detector of closure of the elementary electrical circuit.

12 Claims, 7 Drawing Sheets

(51) Int. Cl.
*F16J 15/52* (2006.01)
*G01M 3/16* (2006.01)

PROTECTIVE BELLOWS HAVING AN ELECTRICAL CIRCUIT AND COVERING FOR A MECHANICAL JOINT

TECHNICAL FIELD

The technical field relates to protective bellows, in particular intended to be used as protection equipment for a mechanical joint, for example in vehicles.

PRIOR ART

The use of protective bellows is standard in mechanical devices, the bellows being intended to be disposed around mechanical members that are considered to be sensitive, for example a joint between two movable parts. The function of a bellows is to preserve the integrity of the operation of the member, by mechanically isolating it from the outside environment.

FIG. 1 schematically represents, for example, steering members of a vehicle C. It is intended to be linked to a steering column CD, the latter being able to be actuated in rotation by a steering wheel that is not represented. The steering column comprises a pinion, the latter being associated with a rack CR. The association of rack and pinion makes it possible to transform the rotational movement of the column into a translational movement. At each of its ends, the rack CR is linked, by an articulated link, to a tie rod B. Each articulated link is protected by a bellows $1_{AA}$. The latter is a cylindrical bellows, covering the respective ends of the rack and of each tie rod.

Other types of joint can be protected by a bellows, for example the joints of an engine shaft, the latter being intended to transmit a traction power to a wheel.

Generally, a bellows is used to protect a joint between two movable parts, so as to avoid dust or any other foreign bodies from entering into contact with the joint. The joint can be a rotational or translational joint. Generally, a bellows is a flexible cylindrical part, of circular or polygonal section, for example rectangular or square. The material of which a bellows is composed can be a plastic material, for example a polymer of PVC (polyvinyl chloride) type, or of polyurethane. It can also be silicone, or a folded fabric.

During use, a protective bellows can be degraded, and be perforated or become porous. Because of this, water can enter and build up inside the bellows, without its presence being easily detectable. Such a buildup of water is undesirable, in particular if the members protected by the bellows are situated in proximity to electrical equipment, or if they are sensitive to corrosion. The objective of the invention is to address this issue, by allowing a simple detection of a presence of water, or of another conductive liquid, in a protective bellows.

SUMMARY OF THE INVENTION

A first subject of the invention is a bellows, intended to cover a mechanical joint, the bellows comprising a cylindrical and corrugated side wall, extending about a longitudinal axis, the side wall comprising:
an alternation of crests and of troughs, forming corrugations, each corrugation being formed by two crests extending on either side of a same trough, the crests being closer to the longitudinal axis than the trough;
flanks, each flank extending between a crest and a trough, each corrugation comprising a first flank and a second flank that are opposite, separated by a same trough;
the side wall being flexible, such that two adjacent crests and/or two adjacent troughs can converge or move apart from one another, in a direction parallel to the longitudinal axis;
the bellows being characterized in that it comprises an elementary electrical circuit associated with a corrugation, or a plurality of elementary electrical circuits, respectively associated with different corrugations, the or each elementary electrical circuit comprising:
a first conductive element and a second conductive element, extending along the first flank and/or the second flank of the corrugation, along an inner face of the side wall, the first conductive element being separated from the second conductive element;
a first conductive track and a second conductive track, linked respectively to the first conductive element and to the second conductive element;
the or each elementary electrical circuit being such that:
the first conductive track and the second conductive track are connected, or configured to be connected, to a detector of closure of the elementary electrical circuit, such that when an electrically conductive liquid extends from the first conductive element to the second conductive element, the closure of the elementary electrical circuit is detected.

According to one embodiment, at least one elementary electrical circuit associated with a corrugation is such that
the first conductive element extends along the first flank of the corrugation;
the second conductive element extends along the second flank of the corrugation, opposite the first flank;
the second conductive element and/or the first conductive element extends at a non-zero distance from the trough of the corrugation.

According to one embodiment, at least one elementary electrical circuit associated with a corrugation is such that the first conductive element and the second conductive element extend along a same flank of the corrugation.

The closure detector linked to the or each elementary electrical circuit can be configured to:
inject an electrical current into the elementary electrical circuit and measure a potential difference between the conductive tracks of the elementary electrical circuit;
or submit a potential difference between the conductive tracks of the elementary electrical circuit and measure an intensity of a current flowing in the elementary electrical circuit.

According to one embodiment, the bellows comprises several elementary electrical circuits. At least one crest, situated between two adjacent corrugations, is such that a conductive element extends on either side of the crest, the conductive element forming:
a first conductive element of a corrugation adjacent to the crest;
a second conductive element of the other corrugation adjacent to the crest.

According to one embodiment, in the or each elementary electrical circuit, a conductive track extends from an outer face of the side wall, an electrical link between the conductive track and a conductive element being made through the side wall. The electrical link can be made, through the side wall, by capacitive coupling.

According to one embodiment, the conductive tracks of at least one elementary electrical circuit extend, at least partly, along the longitudinal axis, to the detector of closure of the elementary electrical circuit, in an internal space delimited by the side wall, the detector of closure of the elementary electrical circuit being situated in the internal space or outside of the internal space.

According to one embodiment, the conductive tracks of at least one elementary electrical circuit extend, at least partly, outside of an internal space, delimited by the side wall, to a detector of closure of the elementary electrical circuit, the latter being situated outside of the internal space.

According to one embodiment, the side wall extends, along the longitudinal axis, between two ends, an aperture being formed at each end, about the longitudinal axis, so as to allow an insertion of a component into the bellows.

A second subject of the invention is a use of a bellows according to the first subject of the invention, to protect a joint between two components that are movable with respect to one another, each component being, at least partly, inserted into the bellows.

A third subject of the invention is a method for detecting the presence of a conductive liquid in a bellows according to the first subject of the invention, the method comprising the following steps:
- connection of the conductive tracks of an elementary circuit to a detector of closure of said elementary circuit;
- when the detector of closure of the elementary circuit generates a signal representative of a closure, generation of an alert signal.

The invention will be better understood on reading the explanation of exemplary embodiments presented, hereinafter in the description, in conjunction with the figures listed below.

FIGURES

EXPLANATION OF PARTICULAR EMBODIMENTS

Figure 1:
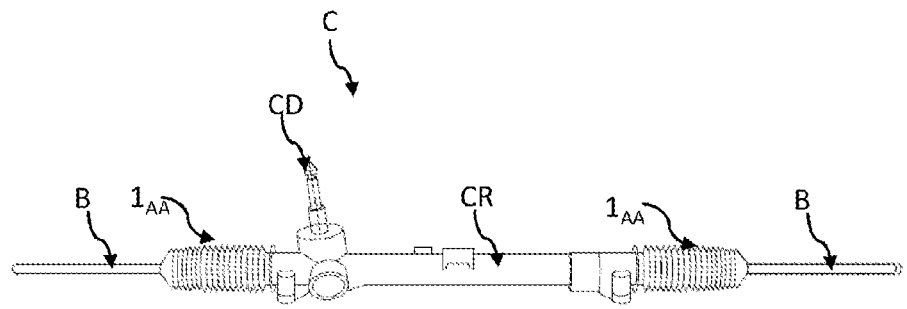
FIG. 1 represents an example of use of a protective bellows.
Figure 2A:
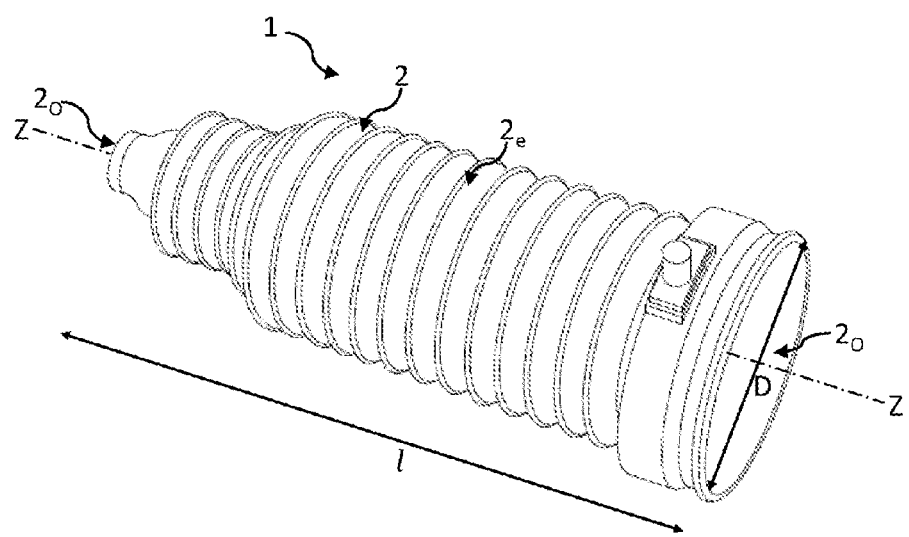
FIGS. 2A and 2B show three-dimensional views of a protective bellows according to the invention.
Figure 2B:
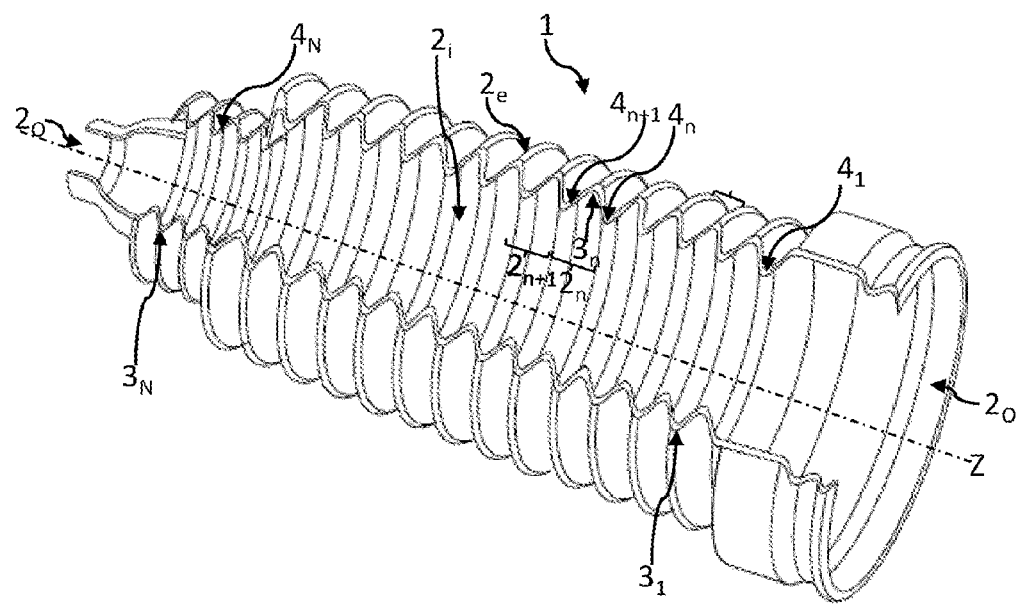

FIGS. 2A and 2B are views of an example of protective bellows 1 according to the invention. The protective bellows 1 comprises a cylindrical side wall 2 extending about a longitudinal axis Z. The side wall 2 comprises an outer face $2_e$ and an inner face $2_i$. In this example, the section of the side wall 2, at right angles to the longitudinal axis Z, is cylindrical of revolution. The side wall 2 extends, along the axis Z, between two ends forming apertures $2_o$. The apertures $2_o$ are intended to allow the respective passage of two components $C_1$, $C_2$ that are movable with respect to one another about a joint A. The diameter of the apertures $2_o$ is matched to the diameter of said components intended to be inserted into the bellows. The components $C_1$ and $C_2$ are represented by dotted lines in FIG. 2C.

Figure 2C:
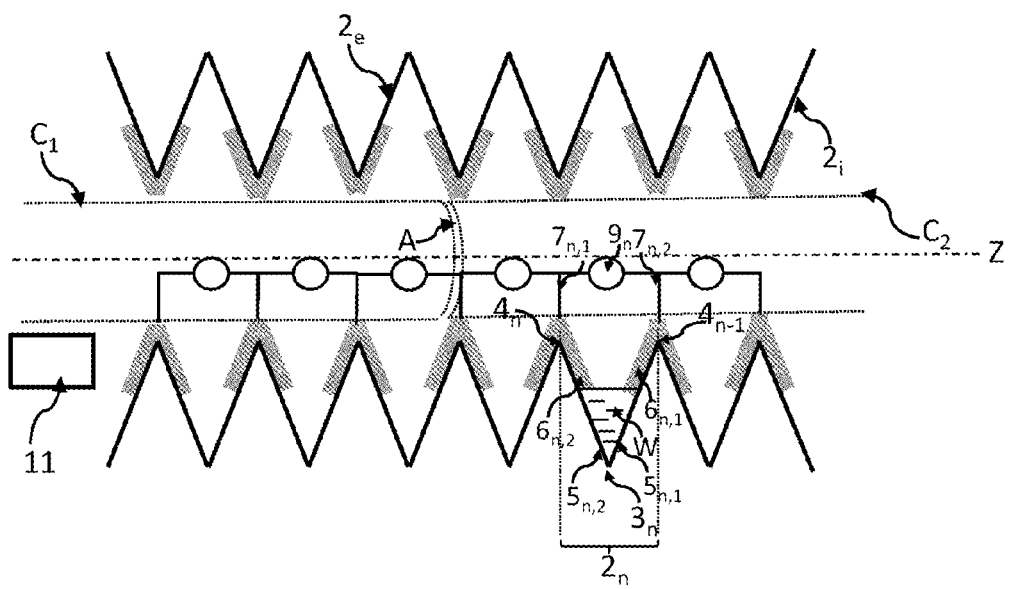
FIGS. 2C to 2E schematically represent a first embodiment.

FIG. 2B is a cutaway view of the bellows 1. The annular wall 2 is corrugated. It comprises an alternation of crests $4_n$ and of troughs $3_n$. The index n is a natural integer designating a rank of each crest or of each trough, with $1 \leq n \leq N$, N designating a total number of crests or of troughs forming the corrugations of the annular wall 2. As can be seen in FIGS. 2B and 2C, each crest $4_n$ is closer to the longitudinal axis Z than two troughs $3_{n-1}$, $3_n$ that are adjacent to it. Since the bellows is flexible, two adjacent troughs $3_{n-1}$, $3_n$ and/or two adjacent crests $4_{n-1}$, $4_n$ can be brought closer together or moved apart, parallel to the longitudinal axis Z, during use of the bellows. The side wall 2 is preferably formed by a dielectric material, for example one of the materials cited in the prior art.

The length l of the side wall 2, along the longitudinal axis Z, generally lies between 10 cm and 30 or 40 cm, even more. The diameter D of the side wall 2 varies because of the corrugations formed by the crests and the troughs. It for example lies between 2 cm and 20 cm. The diameter depends on the dimensions of the components inserted into the bellows 1, through the apertures $2_o$. The thickness of the side wall is small, the order of magnitude being a millimeter or a few millimeters.

FIG. 2C represents a cross-sectional view of a part of the bellows 1 represented in FIG. 2B. In FIG. 2C, a first component $C_1$ and a second component $C_2$ are represented that are movable with respect to one another on either side of a joint A. In this example, the joint A allows a rotation of the components with respect to one another, about the longitudinal axis Z.

The side wall comprises a series of corrugations $2_n$, each corrugation extending between two successive crests $4_n$, $4_{n-1}$. A successive trough $3_n$ and crest $4_n$ are linked by a flank, the latter corresponding to a portion of the side wall 2 linking the trough $3_n$ and the crest $4_n$. A corrugation $2_n$ comprises a first flank $5_{n,1}$ and a second flank $5_{n,2}$, called opposite flanks, extending on either side of a same trough $3_n$. Each flank extends along a surface transversal to the axis Z. In the example represented, the surface of each flank is or approximates a tapered surface, about the axis Z.

The inner face $2_i$ of the side wall 2 is instrumented so as to be able to detect a presence of water or of another conductive liquid W in the bellows. The presence of water in the bellows is reflected by a buildup in a trough, and all the more so when the longitudinal axis Z is horizontal.

Figure 2D:
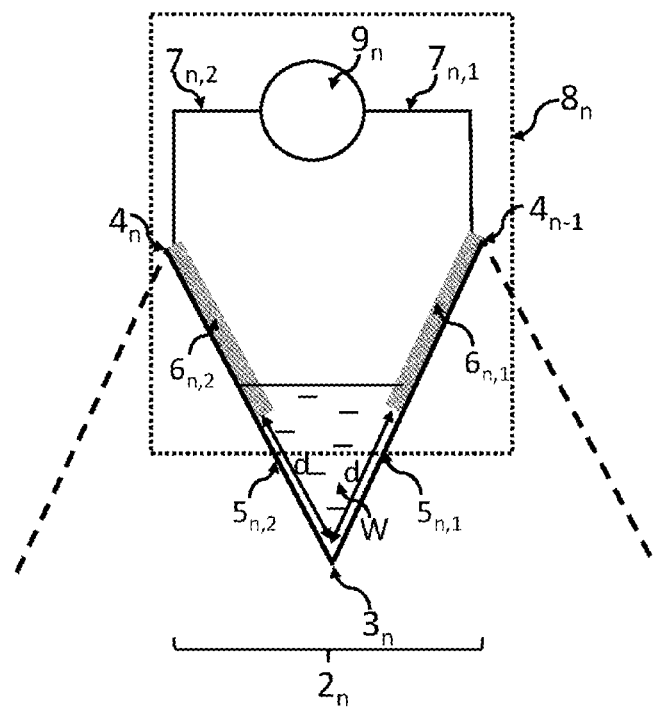

In the example represented in FIG. 2C, at each corrugation $2_n$, the inner face $2_i$ of the side wall 2 comprises a first conductive element $6_{n,1}$ and a second conductive element $6_{n,2}$, separated from the first conductive element $6_{n,1}$. The first conductive element $6_{n,1}$ is linked to a first conductive track $7_{n,1}$. The second conductive element $6_{n,2}$ is linked to a second conductive track $7_{n,2}$. The set formed by the first and second conductive elements and the first and second conductive tracks forms an elementary electrical circuit $8_n$. The elementary electrical circuit $8_n$ is linked to each terminal of a detector $9_n$ configured to detect a closure of the elementary electrical circuit $8_n$. FIG. 2D is a detail of FIG. 2C, showing an elementary circuit $8_n$ associated with a corrugation $2_n$.

The detector $9_n$ is, for example, an ohmmeter. Generally, the detector $9_n$ can be configured to inject an electrical current into the elementary circuit $8_n$, and to measure a potential difference between the first and second conductive tracks $7_{n,1}$ and $7_{n,2}$. Alternatively, the detector is configured to subject the first and second conductive tracks $7_{n,1}$ and $7_{n,2}$ to a potential difference, and measure an intensity in one of the two conductive tracks. When water, or another conductive liquid W, builds up in a trough $3_n$, and extends from the first conductive element $6_{n,1}$ to the second conductive element $6_{n,2}$, the elementary electrical circuit is closed, which can be detected by the detector $9_n$, by a measurement of intensity in a conductive track or an absence of potential difference between the conductive tracks. The detector $9_n$ is linked to a control unit 11, that makes it possible to generate an alert signal when a closure of an elementary circuit is detected.

Thus, the principle of operation of the invention is a detection of a conductive liquid, in a corrugation, comprising an elementary electrical circuit as previously described. When the conductive liquid fills the gap between the first conductive element $6_{n,1}$ and the second conductive element $6_{n,2}$, the presence of conductive liquid is detected by the closure of the elementary electrical circuit $8_n$.

In the example represented in FIGS. 2C and 2D, each corrugation $2_n$ has associated with it an elementary electrical circuit $8_n$. Such a configuration allows a detection of the presence of water in the trough $3_n$ of each corrugation $2_n$. That is particularly suitable for a bellows 1 whose longitudinal axis is intended to be kept horizontal, to within 10° or 20°. When a bellows is intended to be inclined more significantly, the water possibly present in a bellows tends to flow toward the lowest aperture $2_o$. In such a particular case, the corrugation or corrugations closest to the lowest aperture can be instrumented so as to be able to detect a presence of water in the bellows, as previously described.

In the example described in FIGS. 2C and 2D, each elementary circuit $8_n$ is such that:
- a first conductive element $6_{n,1}$ extends along the first flank $5_{n,1}$ of the corrugation $2_n$, at a distance from the trough $3_n$ of the corrugation;
- a second conductive element $6_{n,2}$ extends along the second flank $5_{n,2}$ of the corrugation $2_n$, at a distance from the trough $3_n$ of the corrugation.

In this example, the first conductive element $6_{n,1}$ and the second conductive element $6_{n,2}$ are disposed at a same distance d from the trough. The distance d defines a minimum quantity of water that can be detected in the corrugation. The greater the distance $d_1$ the greater the minimum quantity of water that can be detected. In such a configuration, if the distance between each conductive element and the trough is too small, the first and second conductive elements can touch under the effect of a deformation of the bellows, when the first flank approaches the second flank. The short circuit which results therefrom induces a false detection of presence of water, or a false positive.

Figure 2E:
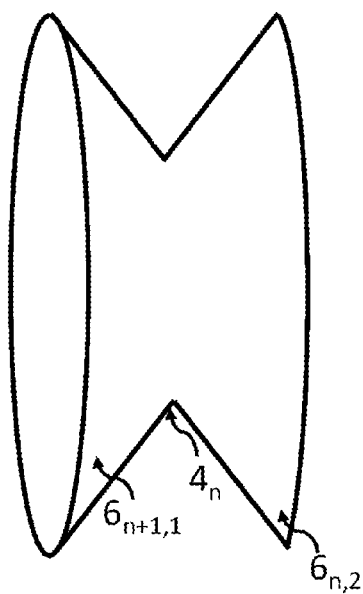

In FIG. 2E, an elementary conductive element is represented, according to the example illustrated in FIGS. 2C and 2D. The elementary conductive element follows the form of the inner wall $2_i$, taking a frustoconical form on either side of the crest $4_n$. The elementary conductive element forms the second conductive element $6_{n,2}$ of a corrugation $2_n$ and the first conductive element $6_{n,+1}$ of a corrugation $2_{n+1}$.

Figure 3A:
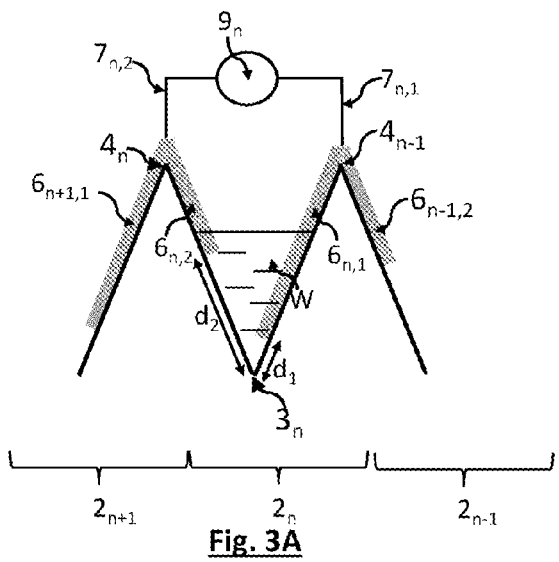
FIGS. 3A to 3D show different configurations of elementary electrical circuits.

FIGS. 3A to 3D represent various possible dispositions of a first conductive element $6_{n,1}$ and of a second conductive element $6_{n,2}$ of a same elementary circuit $8_n$. In FIG. 3A, the first and second conductive elements $6_{n,1}$ and $6_{n,2}$ extend respectively along the first flank $5_{n,1}$ and the second flank $5_{n,2}$. The distance $d_2$ between the second conductive element $6_{n,2}$ and the trough $3_n$ is greater than the distance $d_1$ between the first conductive element $6_{n,1}$ and the trough $3_n$. According to this embodiment, the first conductive element $6_{n,1}$ can extend to the trough $3_n$, in which case $d_1=0$.

In the embodiments described in FIGS. 2C and 3A, the first and second conductive elements $6_{n,1}$ and $6_{n,2}$ extend respectively to the crests $4_n$, $4_{n-1}$ delimiting the corrugation $2_n$. The extension of the first conductive element $6_{n,1}$, below the crest $4_{n-1}$, makes it possible to form a second conductive element $6_{n-1,2}$ of an elementary electrical circuit $8_{n-1}$ associated with the corrugation $2_{n-1}$. The extension of the second conductive element $6_{n,2}$, beyond the crest $4_n$, makes it possible to form a first conductive element $6_{n+1,1}$ of an elementary electrical circuit $8_{n+1}$ associated with the corrugation $2_{n+1}$. Thus, the deposition of a layer of conductive material on either side of a same crest $4_n$ makes it possible to simultaneously form a second conductive element $6_{n,2}$ of an elementary circuit associated with a corrugation $2_n$, and a first conductive element $6_{n+1,1}$ of an elementary circuit associated with a next corrugation $2_{n+1}$. Moreover, according to such an arrangement, one and the same conductive track can be used in two different elementary electrical circuits $8_n$, $8_{n+1}$, respectively associated with the corrugations $2_n$ and $2_{n+1}$. That makes it possible to optimize the number of conductive tracks when two adjacent corrugations are instrumented.

Figure 3B:
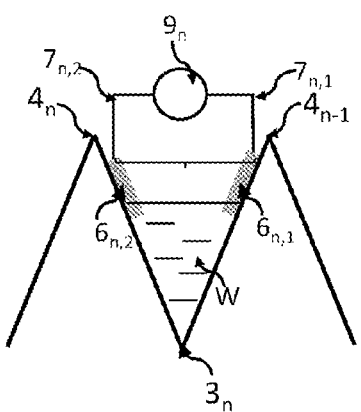

In the embodiment represented in FIG. 3B, the first and second conductive elements $6_{n,1}$ and $6_{n,2}$ extend between the trough $3_n$ and the crests $4_n$, $4_{n-1}$ delimiting the corrugation $2_n$ without reaching the latter. The position of the first and second conductive elements $6_{n,1}$ and $6_{n,2}$ determines the minimum quantity of conductive liquid that can be detected in a corrugation $2_n$.

Figure 3C:
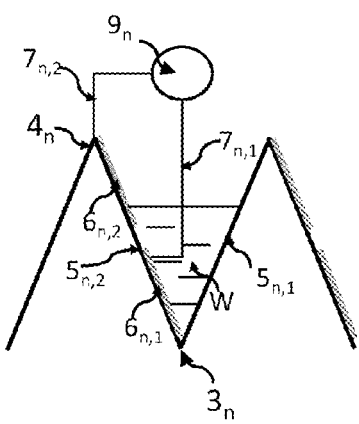
Figure 3D:
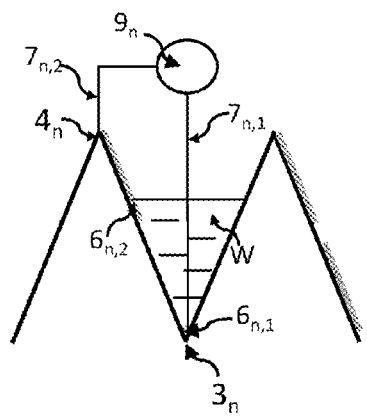

In the embodiment represented in FIG. 3C, the first and second conductive elements $6_{n,1}$ and $6_{n,2}$ extend along a same flank, for example the second flank $5_{n,2}$. As in the preceding embodiments, the first and second conductive elements are separated from one another. The embodiment presented in conjunction with FIG. 3C makes it possible to avoid the formation of a short-circuit that might appear when the two conductive elements of a same elementary circuit, extending respectively along two opposite flanks, are brought into contact under the effect of an excessive convergence of the two flanks. The minimum quantity that can be detected depends on the positioning of the separation between the two conductive elements. According to one possibility, represented in FIG. 3D, the first conductive element $6_{n,1}$ is formed by a simple contact point, in the trough $3_n$.

Figure 4A:
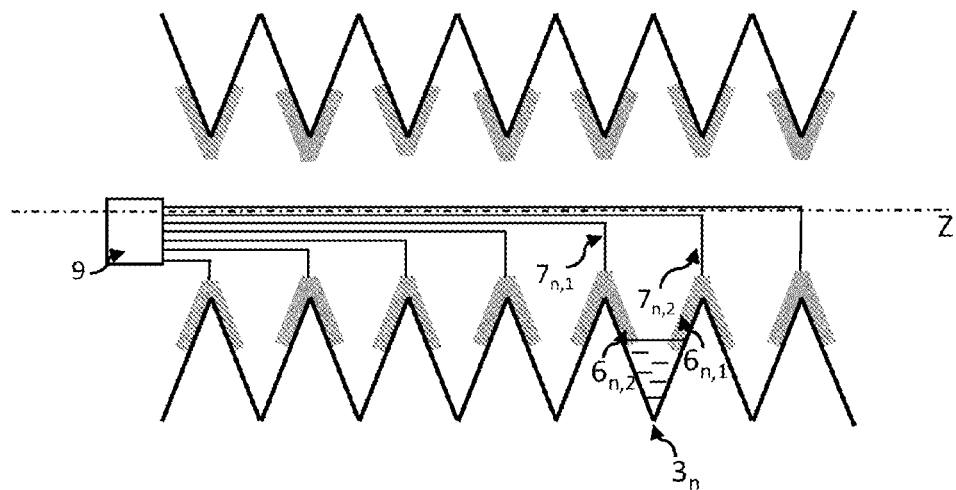
FIG. 4A represents an embodiment according to which the conductive tracks extend, inside the bellows, to a detector of closure of the electrical circuit common to different elementary electrical circuits.
Figure 4B:
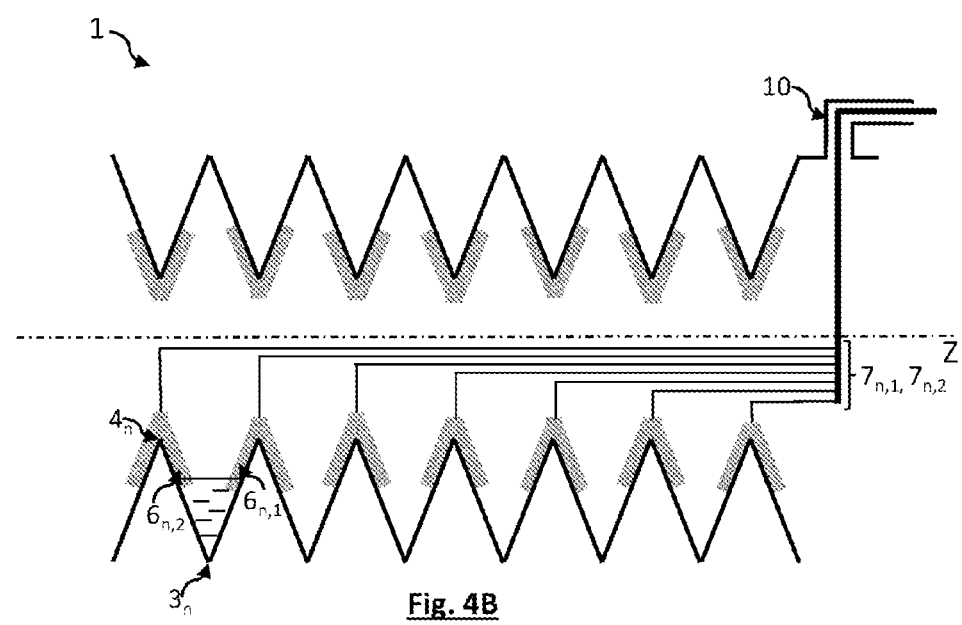
FIG. 4B shows an embodiment according to which the conductive tracks extend, inside the bellows, to a detector of closure of the elementary electrical circuit common to different elementary circuits, and disposed outside of the bellows.

As previously indicated, each elementary electrical circuit $8_n$ is linked to a detector of closure of a circuit $9_n$. It may be advantageous to use a detector of elementary closure 9 common to several elementary electrical circuits. FIG. 4A illustrates such a possibility. The conductive tracks $7_{n,1}$, $7_{n,2}$ of each elementary circuit $8_n$ culminate at a common detector of closure of a circuit $9_n$. The latter can be disposed inside the side wall 2. According to a possibility represented in FIG. 4B, the closure detector 9 can be situated outside of the side wall 2, even remote from the bellows. According to such a configuration, the conductive tracks $7_{n,1}$, $7_{n,2}$ of each elementary circuit $8_n$ extend between a conductive element and the outside of the bellows, for example through a bent tube 10 emerging on the outside. The conductive tracks can be configured to be connected to a common detector of closure of a circuit $9_n$. The latter can be situated on an electronic rack, remote from the bellows.

The use of a common detector of closure of a circuit 9 with several elementary electrical circuits $8_n$ presupposes that the latter can operate by scanning, each elementary electrical circuit being addressed according to a scanning frequency. The scanning frequency can for example be a few Hz or hundreds of Hz.

Figure 4C:
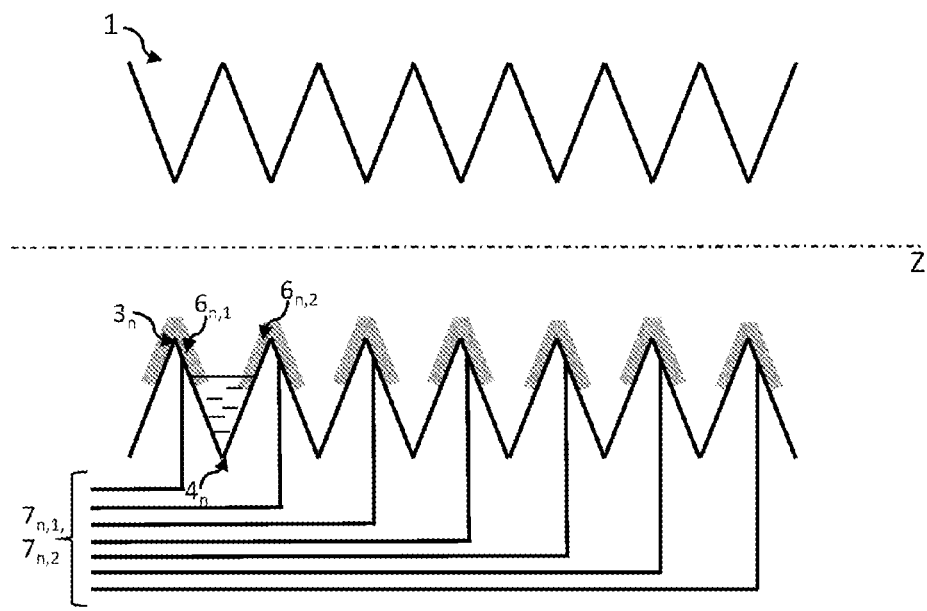
FIG. 4C illustrates an embodiment according to which the conductive tracks extend outside of the bellows.
Figures 5A, 5B:
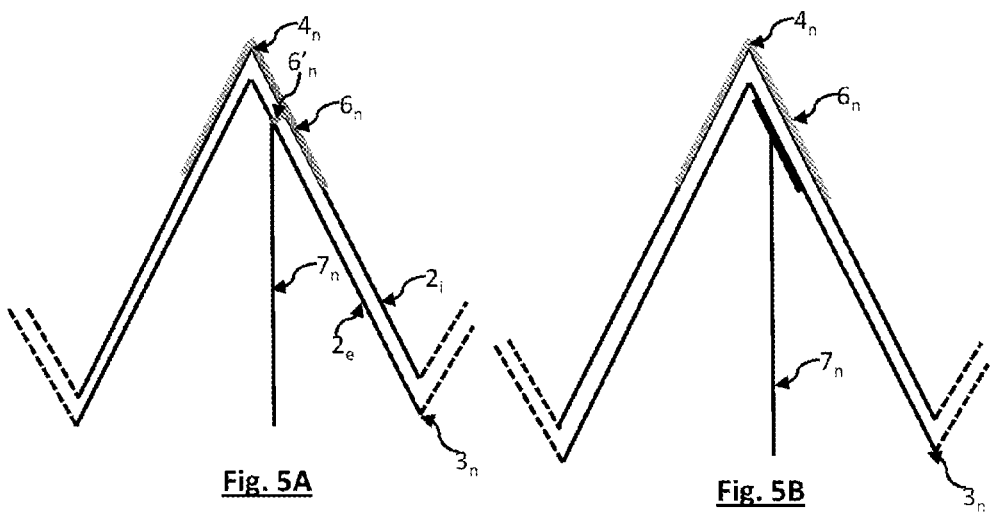
FIGS. 5A and 5B show two variants of the embodiment represented in FIG. 4C, and that make it possible to transmit an electrical signal through the wall of the bellows.

In the examples previously described, the conductive tracks $7_{n,1}$, $7_{n,2}$ of each elementary circuit $8_n$ extend, at least partly, in the inner space delimited by the side wall 2. FIG. 4C schematically represents an embodiment in which the conductive tracks extend outside of the side wall 2. That reduces the risk of disturbance, by the conductive tracks, of the components extending inside the side wall 2. Such a configuration assumes a resumption of contact, on the outer face $2_e$, to transfer an electrical current flowing in a conductive element, outside of the side wall 2. FIGS. 5A and 5B represent two ways of obtaining such a resumption of contact.

In FIG. 5A, a conductive track $7_n$ is represented, linked to the outer face $2_e$ of the side wall, and connected, by a through link $6'_n$, to a conductive element $6_n$ extending along the inner face $2_i$. The reference $7_n$ denotes without preference a first conductive track and a second conductive track. The same applies for the reference $6_n$, which denotes a first or a second conductive element. The through link $6'_n$, or via, is obtained by disposing an electrically conductive material through the side wall 2. The through link $6'_n$ and the conductive element $6_n$ can form a monolithic component. According to this configuration, the conductive track $7_n$ is directly connected to the conductive element $6_n$.

In FIG. 5B, a conductive track $7_n$ is represented linked to the outer face $2_e$ of the side wall, by capacitive coupling. Capacitive coupling is understood to mean a transfer of charges, by capacitive effect, between the conductive track $7_n$ and a conductive element $6_n$, through the side wall 2, the latter being composed of a dielectric material.

Figure 6:
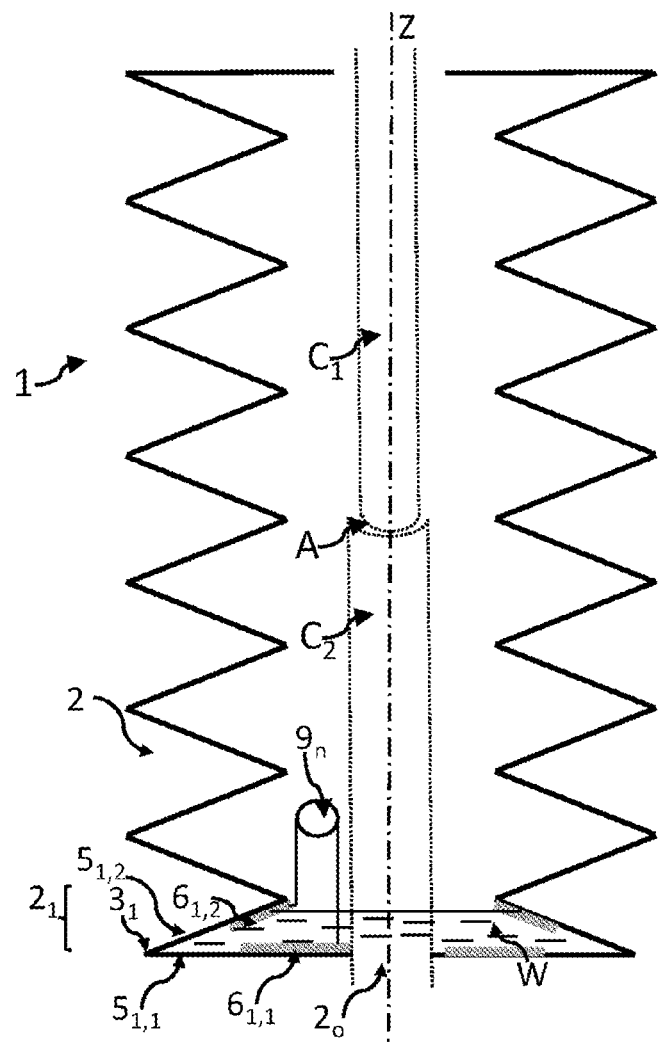
FIG. 6 illustrates an embodiment suited to a vertical orientation of the bellows.

FIG. 6 schematically represents a use of the bellows when the transverse axis is oriented vertically. The water possibly contained inside the bellows accumulates, by gravity, toward the lowest aperture $2_o$. In such a configuration, a single corrugation can be instrumented: it can be the corrugation $2_1$ adjacent to the aperture $2_o$ forming a bottom part of the side wall 2. The aperture is delimited by a lip $5_{1,1}$, forming a first flank of a first corrugation $2_1$. The first corrugation $2_1$ comprises the lip $5_{1,1}$ and a second flank $5_{1,2}$ opposite the lip with respect to a first trough 31.

Whatever the embodiment, each conductive element can be formed by a local deposition of a conductive material, for example a metal, on the inner face $2_i$ of the side wall 2. The formation of a conductive element can comprise a functionalization of a part of the inner face, extending in the vicinity of a crest, or of each crest, so as to locally increase the wettability. The functionalization can result from a silanization (i.e. deposition of a layer of silane) on said functionalized part. It can for example be a layer of hexamethyldisilazane (HMDS), deposited by spray. Following the functionalization, for the purpose of locally increasing the wettability, the inner face can be dipped in a solution comprising metal ions, for example $CuSO_4$. On the removal of the inner face from the solution, the solution is deposited primarily on each functionalized part, resulting in a deposition of copper. Alternatively, each conductive element can result from the application of a conductive adhesive onto the inner face $2_i$, or another means of local coating or impregnation of a conductive material.

The bellows as previously described is intended to be used when two components, mutually jointed with respect to one another, are inserted into the inner space delimited by the side wall. Following the connection of an elementary circuit $8_n$ to a closure detector $9_n$, the latter performs a periodic check on the closure of the elementary circuit. When a closure is detected, the closure detector addresses a signal representative of the closure to a control unit 11, the latter generating an alert signal, intended to inform a user of a potential presence of conductive liquid in the bellows.

The invention will be able to be used in different industrial vehicles or equipment in which a joint between two jointed components must be protected. As previously described, they can be traction or steering members of a vehicle, or a power take-off of a tractor or work site vehicle, or stationary industrial equipment.

The invention claimed is:

1. A bellows, intended to cover a mechanical joint, the bellows comprising a cylindrical and corrugated side wall, extending about a longitudinal axis, the side wall comprising:
   an alternation of crests and of troughs, forming corrugations, each corrugation being formed by two crests extending on either side of one and the same trough, the crests being closer to the longitudinal axis than the trough;
   flanks, each flank extending between a crest and a trough, each corrugation comprising a first flank and a second flank that are opposite, separated by a same trough;
   wherein the side wall is flexible, such that two adjacent crests and/or two adjacent troughs can converge or move apart from one another, in a direction parallel to the longitudinal axis;
   wherein the bellows comprises an elementary electrical circuit associated with a corrugation, or a plurality of elementary electrical circuits, respectively associated with different corrugations, the or each elementary electrical circuit comprising:
   a first conductive element extending along either the first flank or the second flank along an inner face of the side wall, a second conductive element extending along either the first flank or the second flank along the inner face of the side wall, the first conductive element being separated from the second conductive element;
   a first conductive track and a second conductive track, linked respectively to the first conductive element and to the second conductive element;
   the or each elementary electrical circuit being such that:
   the first conductive track and the second conductive track are connected, or configured to be connected, to a detector of closure of the elementary electrical circuit, such that when an electrically conductive liquid extends from the first conductive element to the second conductive element, the closure of the elementary electrical circuit is detected.

2. The bellows as claimed in claim 1, wherein at least one elementary electrical circuit associated with a corrugation is such that
   the first conductive element extends along the first flank of the corrugation;
   the second conductive element extends along the second flank of the corrugation, opposite the first flank;
   the second conductive element and/or the first conductive element extends at a non-zero distance from the trough of the corrugation.

3. The bellows as claimed in claim 1, wherein at least one elementary electrical circuit associated with a corrugation is such that the first conductive element and the second conductive element extend along a same flank of the corrugation.

4. The bellows as claimed in claim 1, wherein the closure detector connected to the or each elementary electrical circuit is configured to:
   inject an electrical current into the elementary electrical circuit and measure a potential difference between the conductive tracks of the elementary electrical circuit;
   or submit a potential difference between the conductive tracks of the elementary electrical circuit and measure an intensity of a current flowing in the elementary electrical circuit.

5. The bellows as claimed in claim 1, comprising several elementary electrical circuits and wherein at least one crest, situated between two adjacent corrugations, is such that a conductive element extends on either side of the crest, the conductive element forming:
   a first conductive element of a corrugation adjacent to the crest;
   a second conductive element of the other corrugation adjacent to the crest.

6. The bellows as claimed in claim 1, wherein the conductive tracks of at least one elementary electrical circuit extend, at least partly, along the longitudinal axis, to the detector of closure of the elementary electrical circuit, in an internal space delimited by the side wall, the detector of closure of the elementary electrical circuit being situated in the internal space or outside of the internal space.

7. The bellows as claimed in claim 1, wherein the conductive tracks of at least one elementary electrical circuit extend, at least partly, outside of an internal space, delimited by the side wall, to the detector of closure of the elementary electrical circuit, the latter being situated outside of the internal space.

8. The bellows as claimed in claim 1, wherein the side wall extends, along the longitudinal axis, between two ends, an aperture being formed at each end, about the longitudinal axis, so as to allow an insertion of a component into the bellows.

9. The use of a bellows as claimed in claim 1, to protect a joint between two components that are movable with respect to one another, each component being, at least partly, inserted into the bellows.

10. A method for detecting the presence of a conductive liquid in a bellows as claimed in claim 1, the method comprising:
    connecting the conductive tracks of an elementary circuit to a detector of closure of said elementary circuit;
    when the detector of closure of the elementary circuit generates a signal representative of a closure, generating an alert signal.

11. The bellows as claimed in claim 1, wherein, in the or each elementary electrical circuit, a conductive track extends from an outer face of the side wall, an electrical link between the conductive track and a conductive element being made through the side wall.

12. The bellows as claimed in claim 11, wherein the electrical link is made, through the side wall, by capacitive coupling.

* * * * *